United States Patent [19]

Bajracharya et al.

[11] Patent Number: 5,141,756
[45] Date of Patent: Aug. 25, 1992

[54] PROCESS FOR PRODUCING SOYA SAUCE

[75] Inventors: Rupak Bajracharya, Valencia, Calif.; Thang Ho Dac; Robert D. Wood, both of Le Mont s/Lausanne, Switzerland

[73] Assignee: Nestec S.A., Vevey, Switzerland

[21] Appl. No.: 565,512

[22] Filed: Aug. 10, 1990

[30] Foreign Application Priority Data

Sep. 12, 1989 [CH] Switzerland ............... 03318/89

[51] Int. Cl.⁵ .............................................. A23L 1/20
[52] U.S. Cl. ........................................ 426/46; 426/589
[58] Field of Search ................... 426/46, 52, 634, 589

[56] References Cited

U.S. PATENT DOCUMENTS 3,830,439 8/1974 Sakasai et al. ..................... 426/46
4,587,127 5/1986 Akao et al. ......................... 426/46
4,684,527 8/1987 Motai et al. ........................ 426/46

OTHER PUBLICATIONS

Fukushima, D. "Soy Sauce and Other Fermented Foods of Japan". Hesseltine, C. W. and Wang, Hwa L., eds. *Indigenous Fermented Food of Non-Western Origin* Mycologia Memoir No. 11, (1986) 121–149.

*Primary Examiner*—Joseph Golian
*Assistant Examiner*—Leslie Wong
*Attorney, Agent, or Firm*—Voge & O'Donnell

[57] ABSTRACT

A process for the production of a soya sauce, in which a koji is prepared by fermentation with a koji culture of a mixture of cooked soya and roasted wheat, the koji is hydrolyzed in aqueous suspension with the enzymes produced during fermentation of the koji, a moromi is prepared by addition of sodium chloride to the hydrolyzed koji suspension, the moromi is left to ferment and is then pressed and the liquor obtained is pasteurized and clarified.

15 Claims, No Drawings

PROCESS FOR PRODUCING SOYA SAUCE

BACKGROUND OF THE INVENTION

This invention relates to a process for the production of a fermented soya sauce.

A traditional oriental process for the production of a fermented soya sauce essentially comprises preparing koji in a first step, preparing and fermenting moromi in a second step and refining in a third step.

In this traditional process, cooked soya beans and/or a cooked, defatted soya flour are mixed with roasted wheat, the mixture is inoculated with a culture of koji or with a pure culture of spores of *Aspergillus oryzae* and/or *Aspergillus sojae*, cultured by aerobiosis and stirred intermittently for one to four days which gives the koji. The koji is mixed with a brine containing approximately 22 to 25% by weight sodium chloride which gives the moromi. The moromi is left to ferment for about 6 to 8 months and then refined by filtration and pasteurization.

A fermented soya sauce obtained by a traditional process such as described above has an α-amino nitrogen content approaching 50% of the total nitrogen.

A major disadvantage of this traditional process is its duration which is necessary for ensuring that the sauce acquires all its aroma through the slow and progressive action, during fermentation of the moromi, of the enzymes produced during preparation of the koji, microorganisms which produce lactic acid and are resistant to the high salt content (halophiles), particularly *Pediococcus halophilus*, and yeasts which produce aromatic substances and alcohol, particularly *Saccharomyces rouxii*.

Accordingly, various processes have been proposed for shortening this duration. U.S. Pat. No. 4,684,527, for example, describes a process which comprises preparing a koji, hydrolyzing the koji and contacting the hydrolyzate with an immobilized peptidase and glutaminase in the presence of salt.

Similarly, U.S. Pat. No. 4,587,127, for example, describes a process which comprises hydrolyzing a cooked mixture of defatted soya and wheat with a solution of enzymes extracted from a koji, contacting the hydrolyzate with immobilized cells of a halophilic lactic bacterium and then fermenting the whole for a few hours with a yeast of soya sauce.

SUMMARY OF THE INVENTION

The object of the present invention is not only to shorten the time required to produce a fermented soya sauce, but also to make it possible to obtain a soya sauce comparable in quality with a fermented soya sauce obtained by a traditional process such as described at the beginning.

To this end, the process according to the invention for the production of a fermented soya sauce is characterized in that a koji is prepared by fermentation with a koji culture of a mixture of cooked soya and roasted wheat, the koji is hydrolyzed in aqueous suspension for 3 to 8 hours at 45° to 60° C. and preferably for 4 to 6 hours at 50° to 55° C. with the enzymes produced during fermentation with the koji culture, a moromi is prepared by addition of sodium chloride to the hydrolyzed koji suspension, the moromi is left to ferment and is then pressed and the liquor obtained is pasteurized and clarified.

This process effectively enables the duration of the moromi fermentation step to be considerably shortened while, at the same time, ensuring that the proteins and carbohydrates are hydrolyzed to a degree comparable with that obtained in a traditional process such as described at the beginning. The fermentation time of the moromi can thus be reduced from about 6 to 8 months to about 4 to 8 weeks for example.

DETAILED DESCRIPTION OF THE INVENTION

In the present specification, the expression "koji culture" means a culture of koji spores of the type available commercially, particularly in Japan or China, which comprises in particular spores of *Aspergillus oryzae* and/or *Aspergillus sojae*.

Whole soya beans are preferably used for carrying out the process according to the invention. However, in one particular embodiment of the process according to the invention, where the liquor obtained after pressing, pasteurization and clarification is subsequently concentrated, dehydrated and ground, it is also possible to use defatted soya flour for example.

The cooked soya may be prepared by soaking crushed soya beans, i.e., soya meal, for a few hours and then subjecting the meal to a temperature of approximately 120° to 140° C. for a few minutes, for example, which guarantees not only cooking, but also sterilization of the meal. The cooked soya meal is then preferably mixed with crushed roasted grains of wheat, i.e., a roasted wheat meal, in a ratio of 50 to 90 parts by weight soya solids to 10 to 50 parts by weight wheat.

After cooling to a suitable temperature of approximately 20° to 40° C. and preferably 30° to 35° C., the mixture may be inoculated with a koji culture or with a pure culture of spores of *Aspergillus oryzae* or *Aspergillus sojae* in a ratio of approximately 1 or 2 parts by weight culture to 10,000 parts by weight mixture. The mixture may then be left to ferment for about 30 to 50 hours at 20° to 40° C. on traditional screens, on a tray or in a commercial apparatus specially designed for this purpose with intermittment stirring and aeration, preferably two or three times in all. In one particular embodiment of the process according to the invention, the mixture is left to ferment for about 20 to 30 hours at 30° to 40° C. and then for 10 to 20 hours at 20° to 30° C. which promotes the production of protease by the koji culture.

The koji, which may have a solids content of approximately 65 to 75%, may be suspended in water by mixing with water in a ratio of 1 to 3 parts by weight water to 1 part by weight koji. This suspension may have a pH of from about 6.0 to about 7.0 which practically varies only very little during hydrolysis.

A relatively small quantity of sodium chloride, namely 0 to 5% and preferably 1 to 3% by weight, may be added to the suspension before hydrolysis. The object of this optional addition of sodium chloride is to exert a plasmolysis effect and thus to contribute towards the release of the enzymes. Mixing and the hydrolysis step itself may be carried out, for example, in a double-jacketed tank equipped with a stirrer.

The hydrolysis step is carried out for 3 to 8 hours at 45° to 60° C. and preferably at 48° to 55° C. The outcome of the hydrolysis step is essentially to provide from the outset all the nutrients required for the microorganisms which are involved in fermentation of the moromi whereas, in the traditional process described at the beginning, these nutrients are only gradually released on account of the high salt concentration. These hydrolysis conditions have to be strictly observed to obtain maximum benefit without any risk of contamination.

The results obtained by this hydrolysis are remarkable because, for a total soluble nitrogen of approximately 0.35% by weight of the koji suspension and an α-amino nitrogen of approximately 30% of the total nitrogen, for example, before hydrolysis, values of 1.2, 1.4 and 1.45% for the total nitrogen and values of 41, 48 and 49% for the α-amino nitrogen, for example, are observed after hydrolysis times o±3, 6 and 8 hours, respectively.

To prepare the moromi, sodium chloride may then be added to the hydrolysed koji suspension in a relatively large quantity, namely in a such quantity that the moromi has a sodium chloride content of approximately 15 to 19% weight.

The fermentation of the moromi is preferably induced by acidification of the moromi to a pH value favourable to the work of the yeasts of the soya sauce. This acidification may be carried out either chemically, for example by addition of lactic acid, or biologically by inoculation with a culture of halophilic lactic bacteria. The moromi may be inoculated with a pure culture of *Pediococcus halophilus* for example. This may done using a quantity of 1 to 2% by volume of a culture containing approximately $10^7$ to $10^8$ cells of the microorganism per ml. The *P. halophilus* may be left to work for 2 days to 2 weeks and preferably for 2–4 days at 20° to 35° C. so that the pH of the moromi, which initially is about 6.2, falls to a value of approximately 4.8–5.5 and preferably to a value of 5.0 to 5.2.

The moromi may then be inoculated with a pure culture of a strain of soya yeast, such as *Saccharomyces rouxii* and/or *Torulopsis etchelsii* for example. This may be done using a quantity of 1 to 5% by volume of a culture containing $10^7$–$10^8$ cells of one or other of these microorganisms or of a mixture of these microorganisms. The moromi thus inoculated may be left to ferment for about 2 weeks to 2 or 3 months and preferably for 4 to 8 weeks at approximately 30° to 35° C. and preferably at 32° to 34° C. with stirring and aeration at least twice a week.

The moromi may then be pressed, for example in a press or a filter press, the insolubles may be removed and the liquor obtained may be pasteurized, for example for 15 to 30 minutes at a temperature of 75° to 90° C. After pasteurization, the liquor is preferably left standing for about 1 to 7 days to allow the insoluble particles which were not removed during pressing to sediment, and is then clarified, for example by passage through a filter paper.

Accordingly, it is possible by the process according to the invention to obtain a fermented soya sauce comparable in taste and aroma with a fermented soya sauce obtained by a traditional process such as described at the beginning.

In one particular embodiment of the process according to the invention, the clarified liquor is concentrated, dehydrated and ground so that fermented soya sauce is in the form of a powder which may be used as a seasoning or subsequently reconstituted with water in a ratio of 2 or 3 parts by weight water to 1 part by weight powder.

To carry out this particular embodiment of the process, the clarified liquor may be concentrated by evaporation for about 30 minutes to 3 hours at a temperature of approximately 55° to 65° C. and under a reduced pressure of approximately 100 to 250 mbar. The sauce, which has a solids content of approximately 30 to 34% by weight may thus be concentrated to a solids content of approximately 60 to 85% by weight.

The concentrated liquor may then be dehydrated to a solids content of approximately 95 to 99% by weight, for example under reduced pressure in a dryer in which it may be subjected for about 1 to 10 hours to a temperature of approximately 60° to 100° C. and a pressure of approximately 10 to 100 mbar.

Finally, the dehydrated liquor may be ground, for example in a hammer mill, to obtain a fermented soya sauce in the form of a powder in which most of the particles are between 0.5 and 2 mm in size.

In this particular embodiment of the process according to the invention, the koji may also be hydrolyzed in aqueous suspension, for example in admixture with non-fermented cooked soya. A dehydrated and ground fermented soya sauce of high quality is thus obtained from the hydrolysis of a mixture containing approximately 1 to 2 parts by weight non-fermented cooked soya solids to 2 parts by weight koji solids for example.

EXAMPLES

The process according to the invention is illustrated by the following Examples in which percentages and parts are by weight, unless otherwise indicated.

EXAMPLE 1

A whole soya meal is soaked in water at ambient temperature for 3 hours. The soaked meal is cooked and sterilized for 4 minutes at 130° C. and then cooled to 30°–35° C. The soya meal is then mixed with roasted wheat meal in a ratio of 70% soya solids to 30% wheat solids. The resulting mixture is inoculated with a koji culture in a ratio of 1 part culture or spore powder to 10,000 parts mixture. The mixture is left to ferment on screens for 44 hours with stirring and aeration twice in all.

50 kg of the koji thus obtained, which has a solids content of 70%, are suspended in water by mixing with 80 kg water and 1.9 kg sodium chloride in a double-jacketed tank equipped with a stirrer. The resulting koji suspension is hydrolyzed by heating to 54° C. and keeping it at that temperature for 5 hours with stirring. Initially, the suspension is stirred slowly and, as the viscosity of the suspension progressively decreases during hydrolysis, the rotational speed of the stirrer is increased to approximately 100 r.p.m. The pH of the suspension, which is 6.3 before hydrolysis, falls progressively to 6.2 during the 5 hours of hydrolysis.

The koji suspension thus hydrolyzed has a total soluble nitrogen content of 1.37% and an α-amino nitrogen content equal to 47% of this total nitrogen.

A moromi is prepared by addition of 17 kg sodium chloride to this hydrolyzed koji suspension. The moromi is inoculated with 1% by volume of a culture of *Pediococcus halophilus* containing $10^7$–$10^8$ cells of the microorganism per ml. The moromi is then left to ferment at 30° C. for 3 days during which the pH of the moromi falls to a value of 5.0 to 5.2.

The moromi thus acidified is then inoculated with 3% by volume of a mixed culture of *Saccharomyces rouxii* and *Torulopsis etchelsii* containing approximately $5.10^8$ cells of each of these microorganisms per ml. The moromi is then left to ferment for 8 weeks at 33° C.

The moromi is then pressed in a press. The liquor is collected and pasteurized for 20 minutes at 85° C. The pasteurized liquor is left standing for 6 days, the insolubles which have sedimented are removed and the liquor is clarified by passage through a filter paper.

The fermented soya sauce obtained in this way is comparable in taste and aroma with a soya sauce obtained by a traditional process such as described at the beginning.

EXAMPLE 2

The procedure is as in Example 1, except that the koji suspension is hydrolyzed for 8 hours instead of 5 hours and the moromi is left to ferment for 4 weeks instead of 8 weeks.

The hydrolyzed koji suspension has a total soluble nitrogen content of 1.45% and an α-amino nitrogen content equal to 49% of this total nitrogen.

The fermented soya sauce obtained after fermentation of the moromi for only 4 weeks is comparable in taste and aroma with the fermented soya sauce obtained in Example 1.

EXAMPLE 3

A koji is prepared in the same way as described in Example 1 except that a cooked soya meal and a roasted wheat meal are mixed in a ratio of 90% soya solids to 10% wheat solids instead of 70%:30%.

25 kg of this koji, which has a solids content of approximately 60%, and 36 kg cooked and sterilized soya meal, which has a solids content of approximately 47%, are mixed. The resulting mixture is suspended in water by stirring with 57 kg water in a double-jacketed tank equipped with a stirrer. 1 kg sodium chloride is added.

The resulting suspension is hydrolyzed by heating at 52° C. for 5 hours.

A moromi is prepared by addition of 17 kg sodium chloride to the hydrolyzed suspension. The procedure is then as described in Example 1 until the clarified liquor is obtained.

The liquor is concentrated for about 2.5 hours at a temperature of approximately 62° C. under a reduced pressure of 100 mbar to a solids content of approximately 80%.

The concentrated liquor is then dehydrated under reduced pressure to a solids content of 98% in a dryer where it is subjected for about 6 hours to a temperature of 65° to 85° C. and a pressure of 50 mbar.

The dehydrated liquor is then ground in a hammer mill equipped with a 1 mm square mesh sieve.

The powder-form fermented soya sauce obtained may be used as a seasoning or may be reconstituted by dispersion in water in a ratio of 1 part powder to 2 parts water. The sauce thus reconstituted has a taste typical of a high-quality fermented soya sauce.

We claim:

1. A process for producing soya sauce comprising:
   mixing water with a koji to form an aqueous koji suspension;
   heating the koji suspension at a temperature of from 45° C. to 60° C. for from 3 hours to 8 hours for hydrolyzing the koji and producing a hydrolyzed koji suspension;
   adding sodium chloride to the hydrolyzed koji suspension to prepare a moromi and fermenting the moromi;
   pressing the fermented moromi to obtain a liquor;
   pasteurizing the liquor; and
   clarifying the pasteurized liquor to obtain a soya sauce.

2. A process according to claim 1 wherein the water is mixed with the koji in an amount of from 1 part to 3 parts by weight water to 1 part by weight koji.

3. A process according to claim 1 further comprising adding sodium chloride to the koji suspension to exert a plasmolysis effect during the heating of the koji suspension.

4. A process according to claim 1 wherein the koji suspension is heated for from 4 hours to 6 hours at a temperature of from 50° C. to 55° C.

5. A process according to claim 1 wherein the sodium chloride is added to the hydrolyzed koji suspension in an amount so that the moromi has a sodium chloride content of from 15% to 19% by weight.

6. A process according to claim 1 further comprising acidifying the moromi to induce fermentation and wherein the acidified moromi is inoculated with a soya yeast for fermentation.

7. A process according to claim 1 wherein the moromi is acidified with a culture of *Pediococcus halophilus* to induce fermentation.

8. A process according to claim 7 wherein fermentation is induced at a temperature of from 20° C. to 35° C. for from 2 days to 2 weeks.

9. A process according to claim 1 wherein the moromi is fermented with a culture selected from the group of cultures consisting of a culture of *Saccharomyces rouxii* and a culture of *Torulopsis etchelsii* and combinations thereof.

10. A process according to claim 9 wherein the moromi is fermented at a temperature of from 30° C. to 35° C. for from about 2 weeks to about 3 months.

11. A process according to claim 1 further comprising inoculating the moromi with a culture of *Pediococcus halophilus* and inducing fermentation at a temperature of from 20° C. to 35° C. for from 2 days to 2 weeks and after inducing fermentation, inoculating the fermentation-induced moromi with a culture selected from the group of cultures consisting of a culture of *Saccharomyces rouxii* and a culture of *Torulopsis etchelsii* and combinations thereof and fermenting at a temperature of from 30° C. to 35° C. for from about 2 weeks to about 3 months.

12. A process according to claim 1 further comprising concentrating the clarified liquor, dehydrating the concentrated liquor to obtain solids and then grinding the solids to obtain a powder.

13. A process according to claim 1 further comprising preparing the koji from a mixture of from 50 parts to 90 parts by weight of crushed cooked soya and from 10 parts to 50 parts by weight of crushed roasted wheat.

14. A process according to claim 11 further comprising preparing the koji with a culture of spores selected from the group of spores consisting of spores of *Aspergillus oryzai* and spores of *Aspergillus sojae* and combinations thereof.

15. A process according to claim 14 wherein the koji is prepared for from 30 hours to 50 hours at a temperature of from 20° C. to 40° C.

* * * * *